United States Patent
Coffin

(10) Patent No.: US 9,001,334 B2
(45) Date of Patent: Apr. 7, 2015

(54) INTERFEROMETER VELOCITY CONTROL OF BEAMSPLITTER AND MOVING MIRRORS

(75) Inventor: John Magie Coffin, Blue Mounds, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 557 days.

(21) Appl. No.: 12/944,512

(22) Filed: Nov. 11, 2010

(65) Prior Publication Data

US 2012/0120405 A1     May 17, 2012

(51) Int. Cl.
  *G01B 9/02*    (2006.01)
  *G01B 11/02*   (2006.01)
  *G01J 3/453*   (2006.01)

(52) U.S. Cl.
  CPC ........................................ *G01J 3/453* (2013.01)

(58) Field of Classification Search
  None
  See application file for complete search history.

(56) References Cited

U.S. PATENT DOCUMENTS

| 4,480,914 A * | 11/1984 | Thompson et al. ........... 356/452 |
| 5,066,990 A | 11/1991 | Rippel |
| 5,159,405 A * | 10/1992 | Ukon ........................... 356/455 |
| 5,239,361 A | 8/1993 | Burch |
| 5,657,122 A * | 8/1997 | Curbelo et al. ............... 356/452 |
| 5,671,047 A * | 9/1997 | Curbelo ........................ 356/452 |
| 5,808,739 A * | 9/1998 | Turner et al. ................. 356/519 |
| 5,883,712 A * | 3/1999 | Coffin .......................... 356/452 |
| 5,994,700 A * | 11/1999 | Rajic et al. ............... 250/339.08 |
| 6,141,101 A * | 10/2000 | Bleier et al. ................... 356/451 |
| 8,169,616 B2 * | 5/2012 | Johnson et al. ............... 356/452 |
| 8,259,300 B2 | 9/2012 | Arnvidarson |
| 2003/0189709 A1 | 10/2003 | Maynard et al. |
| 2005/0270539 A1 | 12/2005 | Abbink |
| 2008/0013097 A1 * | 1/2008 | E. del Puerto ................ 356/500 |
| 2008/0170231 A1 | 7/2008 | Ressler et al. |
| 2008/0291426 A1 * | 11/2008 | Azimi et al. .................... 356/51 |

FOREIGN PATENT DOCUMENTS

| CN | 101573857 A | 11/2009 |
| CN | 101711341 A | 5/2010 |
| WO | WO 98/02720 A1 | 1/1998 |

* cited by examiner

*Primary Examiner* — Jonathan Hansen
*Assistant Examiner* — Hina F Ayub
(74) *Attorney, Agent, or Firm* — Ion C. Abraham

(57) ABSTRACT

A novel means of provided velocity control of an interferometer wherein one of the moving components includes the beamsplitter element is introduced herein. Using a moving beamsplitter and coupled flexure mounting allows improved velocity control because the low mass of the beamsplitter enables the systems disclosed herein to respond faster than conventional mirror velocity controlled interferometer instruments with a resultant lower velocity error so as to provide a more stable and lower noise spectra from the analytical instrument. The control of the velocity of the beamsplitter and if desired, one or both of the configured mirrors, reduces the time wasted changing velocity at the ends of each scan. The result is an increase in data collection available in any given experiment time frame. Such desirable arrangements of the present invention thus allow scans to be collected at higher rates, which beneficially increase the ability to monitor rapidly changing systems.

34 Claims, 4 Drawing Sheets

INTERFEROMETER VELOCITY CONTROL OF BEAMSPLITTER AND MOVING MIRRORS

BACKGROUND OF THE INVENTION

1. Field of the Invention

The present invention relates to the field of optical scientific instrumentation. More specifically, the present invention relates to the dynamic velocity control of a moving beamsplitter and one or more of the reflective components utilized in a Fourier-Transform infrared (FTIR) interferometer.

2. Discussion of the Related Art

An optical interferometer used in a scientific analytical instrument relies on the interference of superimposed optical beams as part of the interrogation means. When configured as a Michelson Fourier-Transformed infrared (FTIR) instrument, the optical output of the interferometer is called an interferogram. The FTIR interferometer itself often includes a beamsplitter and two mirrors, one that is conventionally stationary, and one which is conventionally mobile. The mobile mirror moves along the optic axis while staying optically perpendicular to the light beam at all times. The movement of the mobile mirror is often desired to be feedback controlled in order to hold the mirror velocity constant so that the analytical radiation that passes through the interferometer produces an accurate interferogram. Conventional interferometers have a moving mirror assembly that includes a linear ball bearing, air bearing, slide bearing, or a flexure bearing and is often driven by a linear motor (e.g., a coil coupled to a permanent magnet) to provide velocity control.

Motion and a resultant velocity of the mobile mirror in a conventional system can be tracked by a positioning monochromatic beam of optical radiation operating in conjunction with the analytical radiation beam passing through the interferometer optics. The configured monochromatic beam (e.g., laser) is thus also often partially reflected and partially transmitted through the configured beamsplitter of the interferometer, and because of the design, the split beams are reflected from the conventionally fixed mirror and the conventionally mobile mirror and recombined at the beamsplitter.

The recombined beams at the beamsplitter are thereafter directed to a detection means that can thereby determine the tilt, position, and/or velocity of the mobile mirror along its longitudinal translation axis. With respect to tilt, the deviations in the phases of the components of the recombined beams can be used to indicate a misalignment of the mobile mirror with respect to a perpendicular of the designed longitudinal axis for the optical element. If such deviations are deleterious, a tilt servo controller can apply corrective forces to the support of the mobile mirror so as to realign the face of the mirror. With respect to the position/speed of the mobile mirror, a velocity control servo can analyze the fringe information of the combined beams so as to compare the determined velocity to a desired velocity and generate an additional correction force so as to move the mirror in a controlled linear fashion.

Background information on such an interferometer system that utilizes dynamic velocity and tilt control of the moving mirror, is described and claimed in, U.S. Pat. No. 5,883,712, entitled, "INTERFEROMETER OF AN INFRARED SPECTROMETER WITH DYNAMIC MOVING MIRROR ALIGNMENT" issued Mar. 16, 1999, to John M. Coffin, including the following, "[i]n accordance with the present invention, an interferometer for an infrared spectrometer provides dynamic alignment of the moving mirror to maintain precise alignment between the moving mirror and the fixed mirror. The alignment of the moving mirror in this manner maximizes the stability of the interferometer while achieving high levels of output accuracy despite vibrations due to the movement of the moving mirror on its bearings and vibrations transmitted from external sources to the interferometer. The dynamics of the mounting of the moving mirror allow the position of the mirror to be controlled with high accuracy even in the presence of relatively high frequency vibrations. The structure of the interferometer and of the detectors and controls for maintaining the alignment of the moving mirror are nonetheless simple in construction and contribute relatively little additional bulk or weight to the interferometer."

However, while current dynamic corrective measures, such as, but not limited to, those described above in U.S. Pat. No. 5,883,712 are beneficial, the performance is often limited by all the delays in the configured control loops, the result of which are degraded response times. Moreover, rolling and sliding bearings used in conventional systems so as to move the mobile mirror add velocity error noise as the non smooth parts slide or roll past one another. In addition, because only one of the optical elements is mobile as compared to a plurality of parts moving, as described by the present invention, the response time is inherently longer and the control errors are increased, thus leading to increased errors in the spectral data created by the analytical instrument.

Accordingly, the present invention addresses the need for an improved dynamic velocity control system as utilized in scientific optical interferometers, such as, a Fourier Transform infrared (FTIR) interferometer, by incorporating among other aspects, the novel moving beamsplitter and moving mirror designs presented herein.

SUMMARY OF THE INVENTION

The present invention provides for a novel dynamic velocity controlled interferometer that includes: a first plane reflector configured to respectively receive and return a first portioned beam of a source along a first optical path length; a second plane reflector configured to respectively receive and return a second portioned beam of the source along a second optical path length; a moving beam splitter for receiving a beam of radiation from the source so as to provide the first and the second portioned beams; wherein the moving beam splitter is further adapted to move linearly in a direction toward and away but at a predetermined angle to the configured first and second plane reflectors; movement means coupled to the moving beam splitter to provide linear and tilt control of the moving beamsplitter; and a control means for providing a controlled feedback to the movement means so as to provide adjustment of the positions of the moving beamsplitter with a desired steady velocity, wherein the adjusted positions of the moving beamsplitter further enables optical path length differences between the first optical path length and the second optical path length that in combination provide an interrogating interferogram of the input source beam radiation at a configured exit of the interferometer.

Another aspect of the present invention provides for a dynamic long-stroke velocity controlled interferometer that includes: a moving first plane reflector configured to respectively receive and return a first portioned beam of a source along a first optical path length, wherein the moving first plane reflector is coupled to a moving bearing assembly configured to position the front surface of the first plane reflector substantially perpendicular along a longitudinal axis of the moving bearing assembly; a second plane reflector configured to respectively receive and return a second portioned beam of the source along a second optical path length; a moving beam splitter for receiving a beam of radiation from the source so as to provide the first and the second portioned beams; wherein the moving beam splitter is further adapted to move linearly in a direction toward and away but at a predetermined angle to the configured first and second plane reflectors; movement means coupled to the moving beam splitter to provide linear and tilt control of the moving beamsplitter; and a control means for providing a controlled feedback to the movement means of the moving beamsplitter and the moving first plane reflector so as to provide adjustment of the linear positions of the moving beamsplitter and the moving first plane reflector with a desired steady velocity, wherein the adjusted positions of the moving beamsplitter and the moving first plane reflector further enables optical path length differences between the first optical path length and the second optical path length that in combination provide an interrogating interferogram of the input source beam radiation at a configured exit of the interferometer.

Accordingly, the novel approaches disclosed herein provides for an improved velocity controlled instrument that enables faster response times, lower velocity errors, compact light-weight and cost efficient configurations that nonetheless produce any travel and spectral resolution provided by conventional interferometer systems. It is to be appreciated that the control system and novel configurations for the moving beamsplitter embodiments of the present invention requires no new software or significant hardware changes. The systems disclosed herein merely depend on simple mechanical control provided by flexure spring centering forces to allow conventional velocity servos to control the velocity and position of the beamsplitter and/or one or more moving mirror arrangements at the same time.

DETAILED DESCRIPTION

Figure 1B:
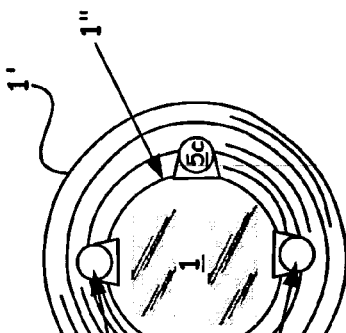
FIG. 1B shows a front view of the beamsplitter portion of FIG. 1A.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

In order to produce high quality interferogram data from an interferometer, e.g., a scanning Michelson FTIR interferometer, a given servo control system is desirably configured to move the scanning parts, such as, one or both of the flat mirrors in combination with the disclosed novel moving beamsplitter of the present invention, with a steady velocity. Even small variations in velocity can affect the data collection resulting in noise, spikes, and non-repeatable results in the collected spectra. The velocity errors themselves can be caused by changes in friction as the moving parts travel along any supporting bearing surface as all practical surfaces have imperfections. Such a velocity control servo is also desirably configured to correct for external vibrations, such as, but not limited to, people moving, loud conversations, and noise generating equipment.

The present invention addresses such problematic velocity variations by providing a dynamic velocity control servo system that keeps the velocity errors down to less than about 0.5% and more often down to less than about 0.2% when desiring best performance. In particular, the present invention beneficially provides for an optical system that can move one or both of the mirrors and/or a low mass beamsplitter assembly within the interferometer so as to reduce response time, which beneficially aids the velocity control system, as disclosed herein. For example, by controlling the velocity of the conventional moving mirror and the novel beamsplitter as disclosed herein, a given velocity correction can be made in less time because each part need only a make a smaller velocity correction and the applied corrections are beneficially additive.

As part of the novelty of the present invention, the beamsplitter of the present invention is coupled to a low mass resilient flexure mount (e.g., a soft diaphragm) that enables a configured control servo system to move the beamsplitter element in a linear fashion to create optical modulation similar to the moving mirror arrangements that are utilized in conventional interferometers. As a result of the beamsplitter configuration(s) of the present invention, velocity error is reduced because: 1) the low mass structure of the beamsplitter assembly as well as optical velocity multiplication provided by the movement of the beamsplitter, as to be described herein, further reduces response time; 2) the flexure bearings are smooth in operation and add less velocity error than conventional bearings (e.g., rolling or sliding bearings); and 3) in the beneficial arrangement of one or more of the mirrors and the beamsplitter being velocity controlled, the response time becomes faster and the control system errors are less than if only one mirror is velocity controlled.

Specific Description

As stated above, it is possible to move either of the mirrors and/or the beamsplitter of the interferometer described herein. Controlling the velocity of such predetermined elements within the instrument can provide for a given velocity correction to be made in less time because each element needs a resultant smaller velocity correction aided by the benefit of the corrections being additive.

Figure 1A:
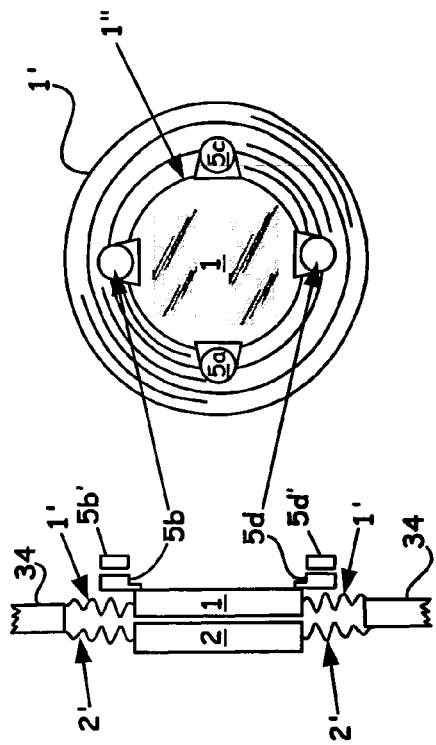
FIG. 1A shows a side view perspective of a beneficial beamsplitter 1/compensating plate 2 configuration.

Turning to the figures, FIG. 1A shows a side view of a beneficial beamsplitter 1/compensating plate 2 configuration that is utilized in each of the disclosed system embodiments to be discussed herein. With respect to FIG. 1A, the novel beamsplitter 1/compensating plate 2 of the present invention is shown with each optical component having respective coupled resilient flexures 1', 2' affixed to a support 34 member. The Beamsplitter 1 component is also shown coupled to magnetic movement means 5b and 5d (reference character 5b' and 5d' relate to the drive coils discussed below with respect to FIG. 1C) so as to enable precision individual movement of the beamsplitter 1 portion.

FIG. 1B shows a front view of the beamsplitter 1 portion of FIG. 1A to give the reader a different perspective of the coupling configuration of beamsplitter 1 with the resilient material 1' (e.g., diaphragm flexure) about its periphery as well as the velocity drive and tilt means (e.g., the coupled magnets, as denoted by the reference characters 5a, 5b, 5c, and 5d). Details of the structure and method of operation of the diaphragm flexure and dynamic tilt control with respect to a moving beamsplitter thereof, is disclosed in Co-pending, Co-filed U.S. application Ser. No. 12/944,428 entitled "Dual Input Interferometer Beamsplitter Tilt Control System and Flexure Mounting," by Coffin et al., the disclosure of which is herein incorporated by reference in its entirety.

Therefore, coupling (e.g., via adhesive bonding) the beamsplitter 1 to the resilient flexure material 1' about its periphery after engaging beamsplitter 1 through a central opening 1", as shown in FIG. 1B, and as described in detail in the aforementioned co-pending application, makes it possible to move the beamsplitter 1 in a linear fashion when induced by applied magnetic forces to magnetic movement means 5a, 5b, 5c, and 5d. The movement of the beamsplitter alone can, if desired, provide for the optical modulation that is substantially similar to the modulation effects capitalized on in conventional interferometer instruments.

Figure 1D:
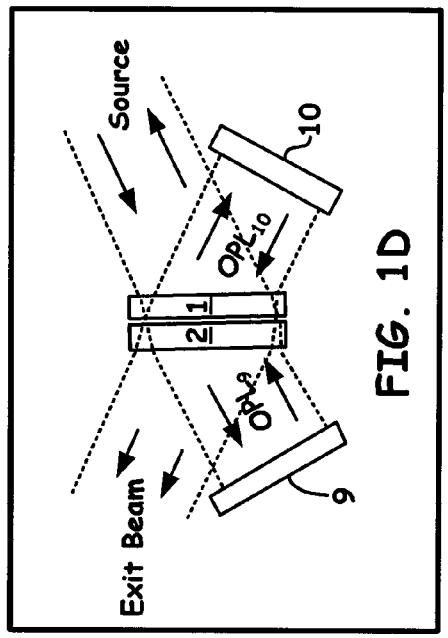
FIG. 1D shows a basic moving beamsplitter interferometer configuration of the present invention so as to aid in the discussion of optical velocity multiplication.
Figure 1C:
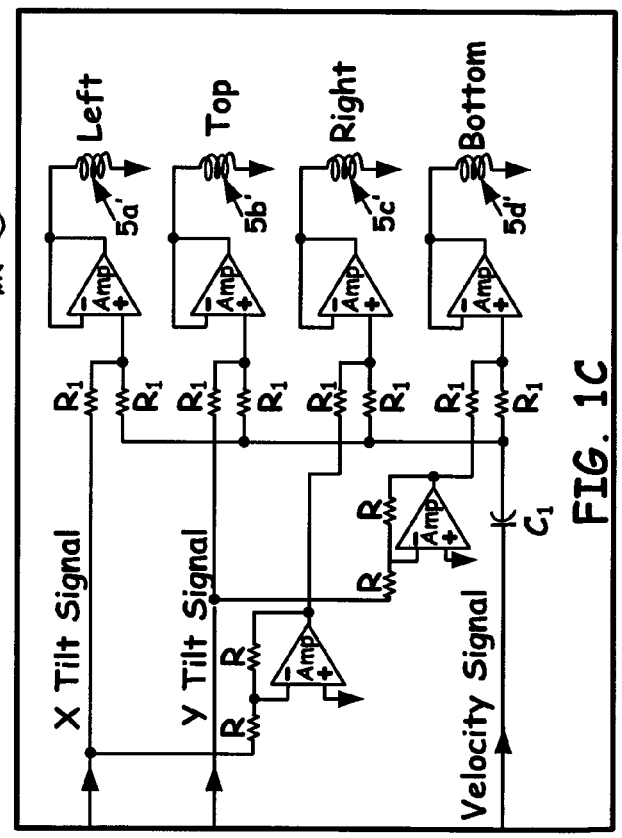
FIG. 1C shows an example resistor matrix and coupled operational amplifiers circuit that can be used to provide the desired velocity and/or tilt movements for the beamsplitter configurations of the present invention.

The velocity of the moving beamsplitter 1 can be controlled by using the same one or more movement means, e.g., predetermined sized magnets 5a, 5b, 5c, and 5d, and coils (e.g., 5a', 5b', 5c', and 5d', as shown in FIG. 1C) that are used to also control the tilt of the optical element. Coupling of the magnets 5a, 5b, 5c, and 5d to the beamsplitter 1 can be by any means known to those skilled in the art, such as, for example, an epoxy-like adhesive.

To provide tilt of the beamsplitter 1, the one or more coils (5a', 5b', 5c', and 5d', as shown in FIG. 1C) that couple magnetic fields to the corresponding one or more magnets, e.g., magnets 5a, 5b, 5c, and 5d, are independently driven by predetermined signals to provide when required, induced mismatched magnetic forces to any of the one or more magnets 5a, 5b, 5c, and 5d. The velocity of the beamsplitter 1 on the other hand is provided by driving the same coils (e.g., 5a', 5b', 5c', and 5d', as shown in FIG. 1C) coupled to the magnets 5a, 5b, 5c, and 5d, as shown in FIG. 1B, all at the same time with substantially the same velocity control signal. In this operation, the substantially matched coupled magnets 5a, 5b, 5c, and 5d receive induced magnetic forces that can move the coupled beamsplitter 1 in a linear fashion. In particular, feedback optical signals (described later) are monitored by a configured velocity control unit (not shown) to provide the appropriate low power level signal signals that are increased or amplified by the servo circuit shown in FIG. 1C so as to induce the magnetic fields that actually result in movement of beamsplitter 1.

It is to be appreciated that because of the design of the beamsplitter configuration (i.e., as coupled to the example flexure shown in FIGS. 1A and 1B), the overall mass of the assembly is reduced. The result is that low forces are needed to move the beamsplitter and this aspect allows the use of small magnets (e.g., about 10 grams per magnet) and small coils of wires (e.g., small flat coils). Accordingly, the coils, as discussed in detail below with respect to FIG. 1C, can be small enough to be configured into spiral art work on a circuit board (not shown) to eliminate the cost and space of separate coils that require manufacturing and then mounting. It is to be noted that if configured as spiral coils, such coils do not need to have the coupled magnets, e.g., 5b and 5d shown in FIG. 1A, to be inserted into a circuit board affixed to the coils, e.g., 5b' and 5d'. Instead, the magnets (e.g., 5b and 5d) can be placed a distance of, for example, about 5 millimeter away from the circuit board (not shown) to enable a beneficial +/−5 millimeter movement of the beamsplitter 1 and coupled magnets e.g., 5b and 5d as shown in FIG. 1A.

As another beneficial aspect, the space between the magnets 5b, 5d and resultant coils 5b' and 5d', as generally shown in FIG. 1A, allows the entire beamsplitter assembly (to include the compensating plate) to be interchanged manually or automatically via, for example, motor drive control by the user. Such an embodiment allows a user to select different interchangeable beamsplitters that are optimized for different light wavelengths. Moreover, this feature allows the easier assembling and servicing of the interferometer.

FIG. 1C thus shows a beneficial example resistor (denoted as $R_1$) and coupled operational amplifier (denoted as Amp with corresponding resistors R) circuit that can be used to provide the desired velocity and/or tilt movements of beamsplitter 1. In this example configuration, only four coils 5a', 5b', 5c', and 5d', as shown in FIG. 1C and four corresponding magnets 5a, 5b, 5c, and 5d, are needed. While the simplistic design of FIG. 1C in combination with the configuration of FIG. 1A is beneficial, it is to be understood that the schematic illustration is intended to be merely exemplary of one of many other designs which are possible. Nonetheless, as stated above, the velocity control signal is applied substantially equal to all configured coils, e.g., coils 5a', 5b', 5c', and 5d' of FIG. 1C. Using this arrangement, the +Y signal is applied to the top coil 5b' and the −Y signal is applied to the bottom coil 5d'. Correspondingly, the +X signal is applied to the left coil 5a' and the −X signal is applied to the right coil 5c'.

As another arrangement for FIG. 1C, a capacitor $C_1$ (i.e., a high pass filter) can be added to limit beamsplitter 1 travel with respect to a particular moving mirror. Specifically, adding $C_1$ in series with the velocity control signal, as shown in FIG. 1C insures that the DC portion of the velocity control signal does not reach moving beamsplitter 1. The capacitor thus acts like a stiffer flexure as its capacitance is reduced. The added capacitor can be configured to limit beamsplitter 1 movement to shorter distances so as to allow the use of moving mirror bearings that have more friction and allows a configured moving mirror, as discussed in detail herein, to also be mounted on flexures, if desired, without causing the movement of beamsplitter 1 to become excessive.

Accordingly, the circuit of FIG. 1C in combination with the design of the beamsplitter 1 of the present invention, can provide a total linear travel, as integrated into the embodiments disclosed herein, at up to about +/−5 millimeter and with a desired velocity as directed by a configured controller (not shown). Because of this beneficial travel limitation, beamsplitter 1 can be mounted substantially close to an arranged compensator plate 2 of the present invention and still not come into contact with the compensator plate 2 as it moves towards and away from the optical element. In particular, because of the fact that the compensator plate 2 is clear and not coated as is beamsplitter 1, flatness, tilt, and position of the compensator plate 2 is much less critical than beamsplitter 1. Therefore, small movements of less than 1 mm of the compensator plate 2 do not have a deleterious impact with respect to the design. Thus, the compensator plate 2 can also be mounted in a resilient flexure-type mount 2' if desired, as shown in FIG. 1A, to protect it from stress with the benefit of not requiring active control of the compensator plate 2 velocity. As another arrangement, the compensator plate can also be mounted) adjacent and facing the coated side of the beamsplitter 1 so as to allow additional room for beamsplitter, beamsplitter mounting, and position movement means.

Optical Velocity Multiplication

Before turning to the various system embodiments of the present invention, the concept of optical velocity multiplication that reduces response time is to be clarified so as to appreciate the benefits of the configurations discussed herein. To aid in the discussion, the reader is directed to the general interferometer schematic of FIG. 1D. With respect to interferometer arrangements of the present invention, FIG. 1D generally shows source radiation being received by a set of optical elements, e.g., beamsplitter 1, compensator plate 2, and reflectors (mirrors 9 and 10), to provide a modulated exit beam.

In general, as the moving beamsplitter 1 moves linearly in a direction toward but at an angle to the configured mirror 10 shown in FIG. 1D (i.e., an angle between the normal of beamsplitter 1 to the normal of a configured mirror (e.g., 10), the optical path length (denoted as $OPL_{10}$) between beamsplitter 1 and mirror 10 is shortened at the same time as the optical path length (denoted as $OPL_9$) to the other mirror (i.e., mirror 9) is lengthened. As a result, the optical path length changes beneficially add, i.e., optically multiply, in manner that is not found in conventional moving mirror systems.

It is to be appreciated however that the desired optical multiplication is reduced somewhat because beamsplitter 1 does move at an angle to both mirrors 9 and 10 so that not all the movement is directly toward the mirror 10. Nonetheless, the present invention capitalizes on this effect via arrangements of the elements shown in FIG. 1D at angles having a range from about 15 degrees up to about 55 degrees, with a preferred angle of about 30 degrees as measured by the angle that the directed light to and from the mirrors 9, 10 makes with respect to the normal of the beamsplitter 1.

As a beneficial non-limiting example, when the beamsplitter 1 to light beam angle is about 30 degrees, the total effect of the optical velocity multiplication is to decrease the beamsplitter velocity about 1.7 times as compared to a conventional moving mirror only interferometer velocity. Correspondingly, such optical multiplication results in about a 1.7 reduction on the total travel needed for the instruments provided herein as compared to conventional systems and furthermore, there is also a tilt correction benefit in that there is about 2 times less physical tilt needed because of the optical multiplication. These smaller physical movements combined with the low weight of the flexure mounted beamsplitter results in lower response time to the control system. The point to take away from this discussion is that in whatever angular arrangement is desirably chosen, because the resultant changes needed to correct a given velocity error is smaller and the time (i.e., response time) to make the smaller correction in velocity is correspondingly less (in addition to the lower physical tilt required), there is a beneficial improvement in overall velocity servo performance. Specifically, resultant lower velocity error results in more stable and lower noise spectra from the analytical instrument.

Moving Beamsplitter Only System

As a general rule, a spectrum itself is said to be collected at a resolution of 1 $cm^{-1}$ if the optical path difference caused by the mirror and beamsplitter movement is 1 cm. In a conventional interferometer the light travels to and from the moving mirror so that a mirror movement of 0.5 cm in a conventional interferometer gives 1 $cm^{-1}$ resolution. For the same resolution the moving beamsplitter only needs to move 0.3 cm. However, a spectral resolution of less than 4 $cm^{-1}$ down to about 64 $cm^{-1}$ is adequate (e.g., for solid and liquid samples) for many applications and requires only very small mechanical movement of about 0.8 mm, which is well within the practical limits of a moving beamsplitter 1 only interferometer system of the present invention. It is to be noted however, that as the scan length is desired to be increased, a moving beamsplitter only system can be modified by alternate beneficial embodiments of the present invention, as also discussed hereinafter.

Figure 2:
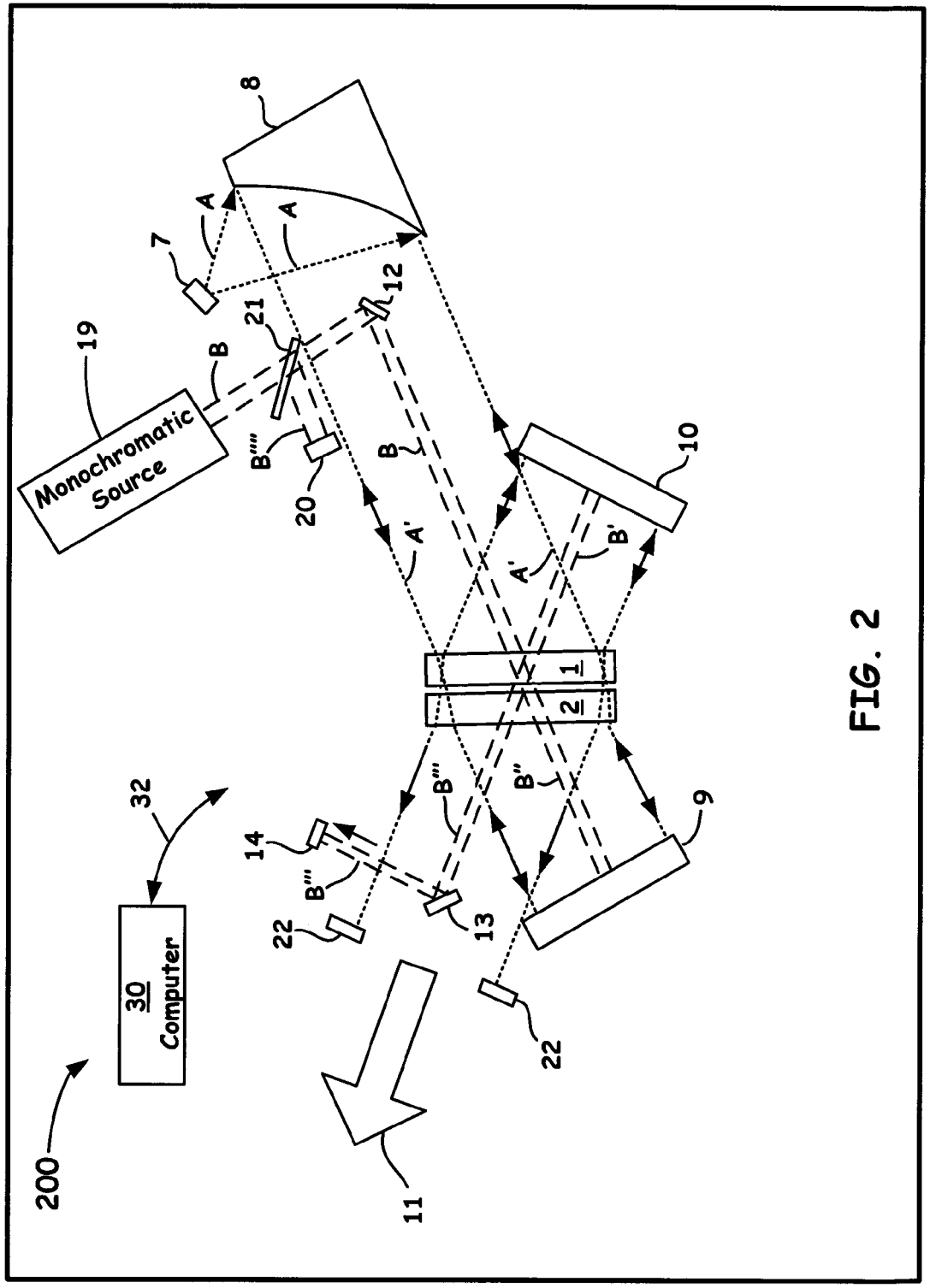
FIG. 2 illustrates a Moving Beamsplitter Only System.

FIG. 2 illustrates an example beneficial embodiment of the present invention, generally designated by the reference numeral 200, wherein the optical layout is in the form of a compact yet rugged FTIR spectrometer system utilizing a Michelson interferometer design but with a beamsplitter 1 only moving configuration. It is to be appreciated that while the system shown in FIG. 2 in addition to other embodiments to be discussed hereinafter are illustrated in schematic form and comprise Michelson interferometer types of geometries, it is to be understood that such interferometer systems can be laid out in many other beneficial configurations, as known to those in the art, and that the general illustration of FIG. 2 as well as other embodiments shown herein is merely intended to be exemplary of such various configurations without limiting it to only that depicted.

It is to be noted that the interferometer 200, and specific components, as shown in FIG. 2, as well as other embodiments disclosed herein, are capable of being operated via a computer or processor 30, which may be a dedicated digital computer or digital signal processor, as known to those of ordinary skill in the art. The coupling 32 between the instrument 200 and the computer 30 is by way of any I/O means for carrying out operations. Often the coupling 32 includes a USB port although the application software can interface with the instrument 200 by any known coupling means as understood by those of ordinary skill in the art. Such coupling means provides programmatic control instruction and operational data (feedback) via the embedded software of the present invention in addition to any other necessary electronic manipulation. The computer 30 is also often electronically coupled to one or more other output devices, such as display screens, printers, etc. and/or one or more other input devices, such as keyboards, internet connections, etc.

It is known to those of ordinary skill in the art that a computer or processor 30, as shown in FIG. 2, can orchestrate the control one or more moving parts of a scanning interferometer system, such as the beamsplitter 1 portion of the novel beamsplitter 1/compensating plate 2 shown in FIG. 2, as well as any other translating optical elements (e.g., reflectors) as utilized in conventional instruments. Such a control means enables the components capable of movement to start, change direction, and move with a desired velocity. In effect, such a computer/processor 30 can determine and thus provide the gain and signals in real time so that a configured circuit can apply necessary drive currents to induce desired movement forces.

Instructions to start predetermined measurements, the analysis of data, etc., are also often primarily executed by the computer 30 shown in FIG. 2. However, operations can also be executed under instructions stored on a machine-readable medium (e.g., a computer-readable medium). A computer-readable medium, in accordance with aspects of the present invention, refers to mediums known and understood by those of ordinary skill in the art, which have encoded information provided in a form that can be read (i.e., scanned/sensed) by a machine/computer and interpreted by the machine's/computer's hardware and/or software.

In particular, the computer-readable media can often include local or remote memory storage devices, such as, but not limited to, a local hard disk drive, a floppy disk, a CD-ROM or DVD, RAM, ROM, a USB memory device, and even any remote memory storage device known and understood by those skilled in the art. The invention may also be practiced in distributed computing environments, wherein associated tasks are performed by remote processing devices that are linked through a communications network (e.g., wireless).

Turning back to FIG. 2, the interferometer 200 provides a beam (denoted by the letter A and small dashed line marking) that leads to directed collimated infrared light (denoted as A' as also shown by the small dashed line marking), as enabled by the off-axis reflector 8 in combination with a heated infrared source 7 chosen from any customized or conventional known source utilized in the field, such as, but not limited to, a wire, metal or ceramic element that is heated to emit a continuous band of optical radiation. By way of operation of the interferometer 200, modulated infrared light 11 exits (as denoted by the large directional arrow) via an output aperture 22.

The interferometer 200 of FIG. 2, being constructed as a Michelson-type of interferometer comprises a pair of fixed mirrors 9 and 10 and a novel moving beamsplitter 1 and compensator plate 2 configuration of the present invention, as discussed above with respect to FIGS. 1A, 1B, and 1D. To provide for accurate frequency information to be generated by the system shown in FIG. 2, the direction of motion, the velocity, and the position of the moving beamsplitter 1 of the present invention requires precise control via a cooperating velocity and position control system (not shown).

Figure 3:
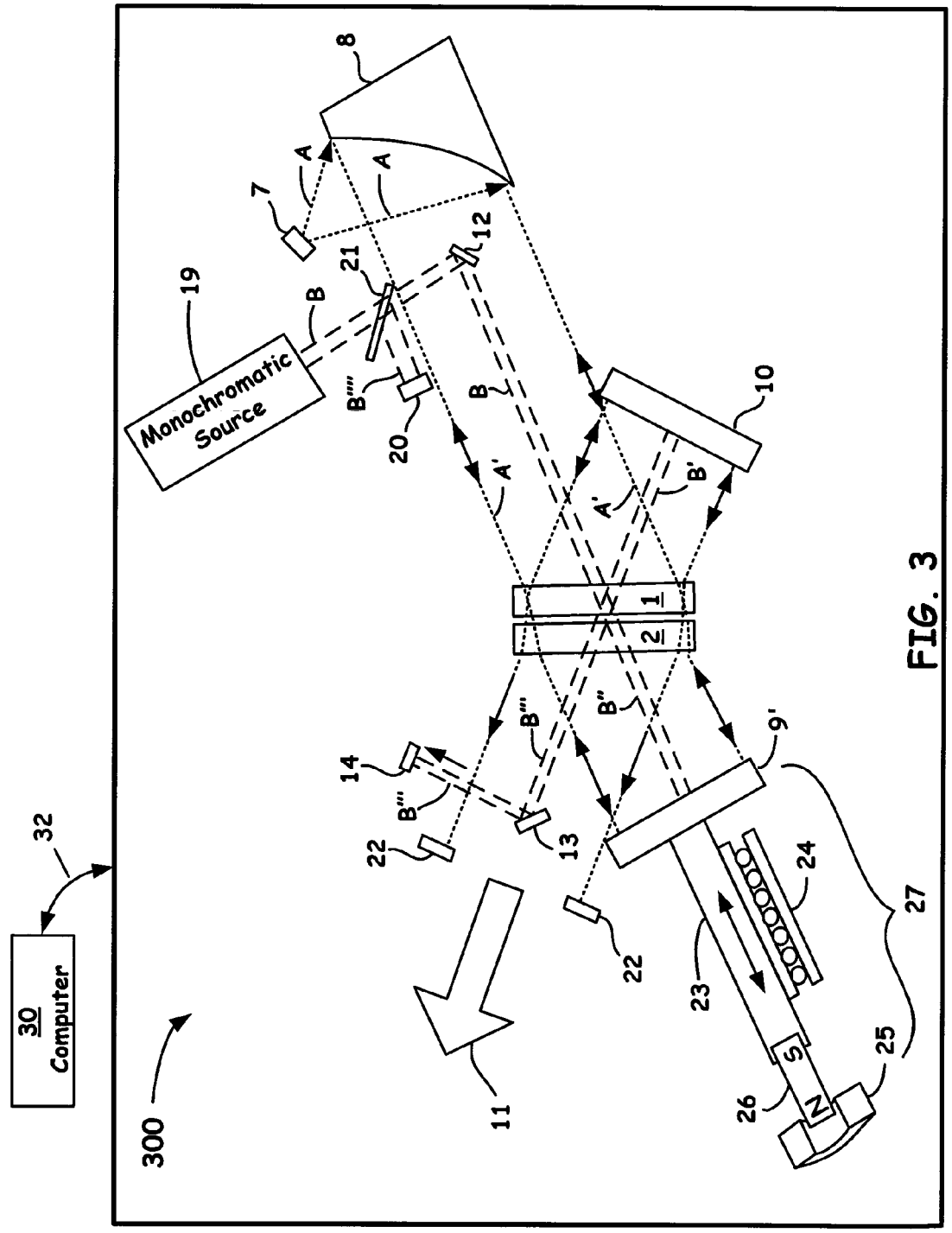
FIG. 3 shows an example Long-Stroke System of the present invention.
Figure 4:
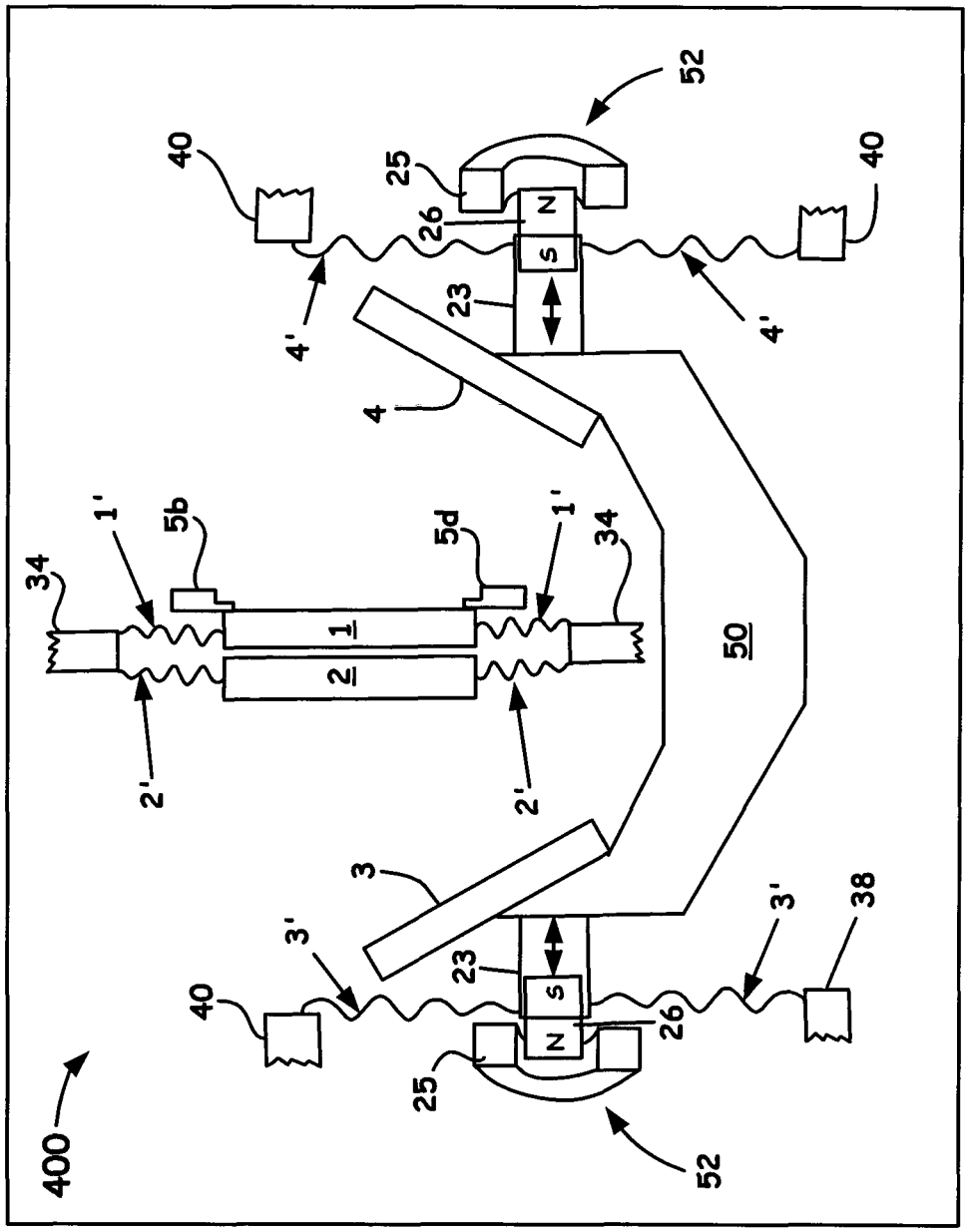
FIG. 4 shows an example all flexure Dual Moving Mirror interferometer of the present invention.

The translational position and correlated velocity of the moving beamsplitter 1, in addition to tilt, can thus, as one arrangement, be detected by incorporating a monochromatic emission source 19 (e.g., laser) which provides an output beam (as denoted by the letter B and larger dashed markings) configured to determine not only the position and velocity of the beamsplitter 1 but also any other moving optical component in system, if desired, as shown and as discussed with respect to the example embodiments of FIGS. 3 and 4. In operation, beam B is directed through a configured beamsplitter 21 and thereafter further directed to the front face of beamsplitter 1 by a mirror 12. Upon being received by the front face of beamsplitter 1, a reflected portion (denoted as B') off of beamsplitter 1 is thereafter received by fixed mirror 10 arranged to retro-reflect beam B' back towards beamsplitter 1/compensator plate 2. A portion of beam B is also transmitted through beamsplitter 1/compensator plate 2, as denoted by B", and directed to the fixed mirror 9, wherein it is also retro-reflected back to beamsplitter 1/compensator plate 2.

The recombination of the portion of the beam B" that passes through beamsplitter 1/compensator plate 2 and thereafter reflected by mirror 9 with the portion of the beam B' directed to and reflected off of fixed mirror 10, provides an output beam (denoted as B''') now having an interference pattern that contains desired optical position and velocity information. Thus, monitoring beam B''' enables the speed and position and tilt of a desired face of moving beamsplitter 1 to be precisely determined by counting the peaks and valleys in the amplitude of the beam B''' as directed by reflector 13 to an interrogating detector 14 (often a quad detector).

As one example embodiment, when configured as a quad detector 14, one of the quadrants can be configured to provide a sine wave signal, which is representative of the of the position and velocity of beamsplitter 1, the signal of which is coupled to velocity control measuring electronics (not shown) for processing. To provide tilt information, the quadrants in combination can be spaced apart so that the deviation of a perpendicular of any moving part of the system to a given longitudinal axis can be determined by differences in the phases of the interference fringes as detected by the different quadrants.

Such tilt and velocity control measuring electronics (not shown) in cooperation with an example controller 30, as shown in FIG. 2, provides for one or more signals shown in FIG. 1C (e.g., the velocity control signal) in an orchestrated manner to move beamsplitter 1 with tilt and with a desired velocity and/or to a desired position. For example, as stated above, a resultant velocity control signal, as shown in FIG. 1C, can be applied substantially equal to all configured coils, e.g., coils 5a', 5b', 5c', and 5d' for a desired movement and/or velocity with a +Y signal being applied to the top coil 5b' and a −Y signal being applied to the bottom coil 5d' and with a +X signal being applied to the left coil 5a' and a −X signal being applied to the right coil 5c'.

It is to be noted that the moving beamsplitter 1 interferometer 200 arrangement, as shown in FIG. 2, does have particular aspects that are not found in conventional interferometer systems as a result of providing desired movements of beamsplitter 1. For example, it is to be noted that as beamsplitter 1 moves linearly during a scanning process, the exiting modulated infrared light beam 11 in addition to the beam (i.e., beam B''') that is monitored for speed and position of moving mirror 1 both translate laterally, i.e., the linear translated distance of beamsplitter 1 results in the exiting beam 11 and beam B''' being sideways displaced a physical distance about one half as far as the distance that beamsplitter 1 has moved.

However, as noted above, the moving beamsplitter 1 of the present invention can be, but not necessarily, designed to have a total linear travel, as integrated into the embodiments disclosed herein, at up to about 10 millimeters (i.e., +/−5 millimeters). Thus, the translational movements of beam 11 can be minimized by driving the beamsplitter to desired scan lengths so as to provide for acceptable exit beam 11 lateral movements. For example, an example total scan length for beamsplitter 1 can be configured at about 2 millimeters so as to provide for a translational movement of beam 11 of less than about 1 millimeter.

As an alternative design for the modulated exiting beam 11 of broadband infrared light, the larger diameter of between about 20 millimeters up to about 50 millimeters for beam 11 is large enough in diameter so that the deleterious movement effect in the example discussed above, i.e., the example 1 millimeter lateral movement due to a maximum 2 mm translation of beamsplitter 1, can be eliminated by limiting the size of the exiting beam 11 via fixed output aperture 22 at the exit location, as shown in FIG. 2. Limiting apertures such as conventional mirrors or lens systems as configured in the light beam exiting the interferometer can also become the fixed output aperture 22 through proper design. Any of such fixed aperture arrangements allow the rest of the spectrometer arrangements disclosed herein, such as the system shown in FIG. 2, to be left unchanged.

It is to be noted that while the modulated exit beam 11 can be tailored with dimensions so as to not be impacted by the movement of beamsplitter 1, the normally smaller diameter for the monochromatic source 19, which also makes a resultant sideways motion when moving the beamsplitter 1, can additionally be problematic because the monitored beam B''' can fall off the desired quadrant of detector 14. An example arrangement to overcome this potential problem is to expand the beam B provided by source 19 to about 3 millimeters or greater in diameter (e.g., when moving the beamsplitter at up to about 2 millimeters in total travel) in order to cover a required area of detector 14.

An alternative example design is to use the returning laser light beam that is directed back to the monochromatic light source 19. Such a beam has the same optical velocity and position information as the exiting beam B''' with the benefit that it does not translate sideways even as beamsplitter 1 moves. This returning beam can be received upstream by beamsplitter 21 designed to direct a portion (denoted as B'''' in FIG. 2) of the received beam to a second detector 20 (e.g., another quad detector) often but not necessarily mounted near monochromatic source 19.

Long-Stroke System (Moving Mirror/Moving Beamsplitter)

If 4.0 cm$^{-1}$ to about 0.05 cm$^{-1}$ or greater resolution is needed (e.g., for gas analysis), the present invention can be configured to move one or both of the mirrors while using simultaneously the moving beamsplitter 1 of the present invention for tilt and short term velocity control. In this manner, the lightweight beamsplitter of the present invention can provide the benefits of low mass, rapid control and shipping shock protection while simultaneously capable of collecting data at any scan length similar to that of conventional interferometers.

FIG. 3 illustrates such an example embodiment, as now generally designated by the reference numeral 300, wherein the optical layout is in now shown in the form of a long-stroke FTIR Michelson interferometer. A similar moving mirror only arrangement is described and claimed in, U.S. Pat. No. 5,883,712, entitled, "INTERFEROMETER OF AN INFRARED SPECTROMETER WITH DYNAMIC MOVING MIRROR ALIGNMENT" issued Mar. 16, 1999, to John M. Coffin, the disclosure of which is incorporated by reference in its entirety.

Similar to the Moving Beamsplitter Only System, as discussed for FIG. 2, FIG. 3 illustrates a system having all of the aforementioned components (as denoted by like reference numerals) with the added benefit of having the formerly fixed mirror 9 of FIG. 2 now being replaced by a moving mirror 9' assembly 27 (e.g., mirror 9', support frame 23 and bearing means 24 driven by a motor, such as, for example, a linear motor comprising a coil 25 and a permanent magnet 26). The bearing means 24 for movement can include any conventional linear bearing system configured to translate along a desired longitudinal axis (movement shown by bi-directional arrow on frame 23) with the restriction that it must not pitch or yaw more than about 50 arc seconds (to prevent the exit beam from moving relative to either the sample or light detector). Example bearing means 24, as shown in FIG. 3, to provide movement of the mirror assemblies 27 of the present invention can include, linear rolling ball bearings, air bearings, sliding bearings, and/or flexure bearings.

Such a compound system 300, as shown in FIG. 3, allows the moving mirror 9' system, i.e., the long-stroke system, to be heavier without compromising the performance of the overall system. In particular, the configuration as shown in FIG. 3, i.e., the system having both a moving mirror 9' and a moving beamsplitter 1, allows very high scan lengths to be collected (limited only by the size of the bearing and motor) without losing the benefits of the moving beamsplitter 1 only interferometer system, as shown and as discussed above with respect to FIG. 2.

While the velocity control of the system 300 shown in FIG. 3 can be provided herein solely by the moving mirror assembly 27 with tilt control provided by the moving beamsplitter 1 and/or by controlling tilt of the front face of the moving mirror 9', it is to be appreciated that such a velocity control arrangement is not as beneficial as when the control is coupled using a system that incorporates both a moving mirror 9' and a moving beamsplitter 1 configuration similar to the system discussed above with respect to FIG. 2.

In particular, a beneficial embodiment of the present invention is a configuration wherein the velocity control signal is applied to both of the aforementioned optically monitored moving parts, i.e., mirror 9' and beamsplitter 1. By velocity controlling both moving parts, the response time with respect to velocity error signals can be reduced so as to beneficially reduce servo velocity errors faster than if only one of the moving parts is velocity controlled. The reduction in response time allows the changing of velocity and direction of travel during predetermined scans to be finished in time frames (e.g., less than about 10 milliseconds) that are less than conventional moving reflector (mirror) systems. Such a reduction is of value when many short scans are needed to observe rapidly changing samples.

A single conventional velocity control servo can thus be configured to control both the moving beamsplitter 1 and a moving mirror 9' using the natural centering force of the resilient flexure discussed above to allow the beamsplitter 1 to make small controlled strokes while the moving mirror 9' with a non-flexure bearing makes the long controlled strokes. In this arrangement, the control system of the present invention has the fast response time of the moving beamsplitter of FIG. 2 and the long stroke of a linear bearing moving mirror 9', the result of which improves the overall active velocity control design depicted herein to enable a system that is similar to, but an improvement of, conventional long stroke systems that provides high resolution.

As another beneficial arrangement, as similarly discussed above with respect to FIG. 1C, the velocity control servo signal can be sent through a high pass filter (i.e., a capacitor) before it is used to drive the moving beamsplitter 1 while the moving mirror 9' is controlled with a configured conventional velocity control signal. Such a configuration enables the moving beamsplitter 1 to rapidly change velocity to improve velocity control and at the same time limit the moving beamsplitter 1 stroke even if moving mirror 9' is mounted on a flexure or high friction linear bearing. As an added arrangement, the high pass filter can be changed by changing the capacitor size to control the moving beamsplitter 1 stroke length compared to the moving mirror stroke length.

Example Method of Operation

Controlling the velocity of moving beamsplitter 1 and the velocity of moving mirror assembly 27 at the same time using, for example, a standard velocity control servo (not shown) can be accomplished by allowing the inherent spring centering forces of a configured diaphragm structure (e.g., resilient flexure material 1', as shown in FIG. 1B), to control the amount of movement of beamsplitter 1 as compared to the amount of movement with respect to mirror 9'.

As part of the configuration, a tilt control system (not shown) is integrated with system 300, as shown in FIG. 3, and the monitoring laser signals (e.g., B) are expanded, as discussed above. Operationally, beamsplitter 1 is initially resting at a center location (i.e., having zero flexure force) and a zero velocity. Moving mirror 9' can be driven to a starting location at a configured mechanical end stop (not shown). The velocity servo is at that moment generating zero voltage and zero force.

At the moment the velocity servo (not shown) is turned on, it generates a force to increase the velocity of beamsplitter 1 and a force on moving mirror 9' that provides opposing movements of such optical elements. In a time frame of less than about 3 milliseconds, the velocity between beamsplitter 1 and mirror 9' increases to a desired velocity (e.g., about 0.5 mm/sec). During this time the distance beamsplitter 1 and mirror 9' have moved is minimal so that the flexure (1' as shown in FIG. 1A) is still near the resting position creating very little spring force on moving beamsplitter 1.

It is to be noted that while the flexure spring force and the bearing force are both low, the change in velocity of the moving parts is drive force divided by moving mass. Therefore, because beamsplitter 1 is designed to be of a lower mass (e.g., 3× lower than the mass of assembly 27), it can tend to travel at a velocity faster than that of mirror assembly 27 (in this example, three times as fast assuming the magnetic forces are substantially the same).

For the first few milliseconds, the low velocity error results in a low drive force and beamsplitter 1 and moving mirror 9' continue to move at a velocity ratio defined by their masses (e.g., at about a three to one speed ratio). In a short time frame of less than about 60 milliseconds, beamsplitter 1 and moving mirror 9' have moved a distance such that the diaphragm flexure 1', as shown in FIGS. 1A and 1B, is now applying an increasing retarding force as it flexes away from the zero force center of travel starting location. This retarding force causes beamsplitter 1 velocity to decrease, the result of which causes a given velocity servo to increase the drive force as needed to maintain the correct velocity.

It is to be appreciated that because the moving mirror bearing retarding force is the same low value at all moving mirror 9' positions, the increase of drive force at this operational point speeds up the moving mirror 9' while simultaneously causing beamsplitter 1 to slow down. At some time thereafter (e.g., after about 120 milliseconds), beamsplitter 1 movement comes to a halt but then slowly starts to move back to its initial resting position as moving mirror 9' picks up speed.

Accordingly, beamsplitter 1 movement is primarily the most when the velocity changes at the turnaround at the ends of a scan stroke as moving mirror 9' makes a full stroke length because beamsplitter 1 travel is limited by the spring force of the coupled diaphragm 1' flexure about its periphery. It is to be noted that the total length of beamsplitter 1 movement can be configured to be less than 1 millimeter regardless of the length of the stroke of moving mirror 9'. At all times the velocity servo (not shown) can beneficially control the velocity very quickly because beamsplitter 1 and moving mirror 9' can respond to the rapid changes in velocity correction signals.

It is to be noted that the long stroke system 300, as shown in FIG. 3, can be configured with a rolling or sliding bearing 24 when desiring to reduce costs. While such rolling or sliding action resulting from such means adds error noise, i.e., jitter as known to those skilled in the art, the smaller response time in using a moving beamsplitter 1 of the present invention counteracts such resultant bearing noise by the beneficial fact of a decrease in velocity error.

If the system 300 of FIG. 3 is configured to operate in a low resolution mode (thus operate with short strokes), as discussed above for the Moving Beamsplitter Only system of FIG. 2, the bearing noise can be removed by arranging moving mirror 9' to be held in a fixed position using mechanical, magnetic and/or electrical braking means as known in the art. Specifically, when configured to operate with short strokes to provide for desired low spectral resolution measurement of about 4 $cm^{-1}$ or less, the system 300 can be configured with a braking means to improve the stability of the low resolution (4 $cm^{-1}$) data by using the quiet beamsplitter 1 resilient flexures 1' shown in FIGS. 1A and 1B as the only moving part for low resolution data collection. The result is the beneficial elimination of the velocity error caused by bearing friction and roughness.

Moving Dual Mirror Interferometer

FIG. 4 shows a simplistic example arrangement of a low cost, rugged, high performance, all flexure interferometer, generally designated by the reference numeral 400. Such a system 400, also being constructed as a Michelson-type of interferometer, thus now includes a pair of moving mirrors configured to beneficially cooperate with the moving beamsplitter 1 and compensator plate 2 configuration of the present invention, as discussed above.

As a beneficial aspect of the configuration, the moving dual mirror beamsplitter combination of FIG. 4 can operate in any orientation by substantially matching the resilient flexure (diaphragm) stiffness to mass ratios of the moving beamsplitter and moving dual mirror assembly. Therefore, control software sees no large change in operating parameters and requires no significant changes. As another arrangement, the present invention can be configured with more complicated or custom software to operate in any orientation even if the stiffness to mass ratios is not matched. As even another added benefit of the configuration shown in FIG. 4, the moving dual mirror assembly in operative cooperation with the moving beamsplitter of the present invention provides for a reduction in the pick-up vibration frequencies of greater than about 10 Hz again even if the stiffness to mass ratios of the moving part are not matched because the ability of both mirrors and the beamsplitter to move (as a similar or matched pair) relative to the supporting means gives a significant isolation from vibrations that move the supporting means. These vibrations are commonly caused by room noise, people moving, and nearby machinery and thus this reduction does not require active velocity control and therefore works at much higher frequencies as opposed to active control systems that are limited to correcting only low frequency vibration induced velocity errors.

To aid in describing the novel aspects of FIG. 4, some of the aforementioned elements required for operation, e.g., the infrared source 7, the monochromatic source 19, and respective optics and other elements, etc., are left out of the discussion as they are utilized in the same fashion as described above.

Thus, the system 400 of FIG. 4 is capable of using a moving beamsplitter 1 and a control system and other optical aspects similar to the implementations as described above, with the differences between this embodiment and the previously described designs generally being mechanical. Turning specifically to FIG. 4, system 400 shows an integrated beamsplitter 1/compensating plate 2, as similarly shown and described in FIG. 1A, having respective coupled resilient flexures 1', 2' affixed to a support 34 member, and an example pair of magnetic movement means 5b and 5d to enable precision individual movement of the beamsplitter 1 portion. As described above with respect to FIGS. 1A and 1B, such magnetic movement means in the various configurations can provide tilt when directed by independently driven signals and also can provide velocity of the beamsplitter 1 via a same velocity control signal.

As part of the moving dual mirror assembly, FIG. 4 shows a pair of coupled moving mirrors 3 and 4 via a U-shaped mount 50, at least one motors means 52, e.g., a linear motor comprising a coil 25 and a permanent magnet 26 as described above for FIG. 2, one or more translating intermediate structures 23 (also denoted with double arrows to signify back and forth movement), and an additional pair of resilient flexures 3', 4' (of similar design and purpose described above for the configured diaphragm structure 1' of FIG. 1B), wherein such flexures 3', 4' are coupled to a common mount 40, often a mount constructed of a rigid material for stability of the overall moving assembly.

It is to be appreciated that because of the coupling arrangement of mirrors 3 and 4, such optical elements operationally move together as a unit in a substantially linear fashion. The double moving mirror assembly by design (i.e., U-shaped mount coupled to mirrors 3 and 4, etc.) is configured so that it substantially fits about the beamsplitter 1/compensating plate 2 arrangement of the present invention. The additional resilient flexures 3' and 4' are coupled to mount 40 at the outer ends to provide support for the mirror assembly of FIG. 4. The spacing of flexures 3', 4' of about 50 millimeters up to about 200 millimeters apart aids in reducing tilt of mirrors 3 and 4 caused by any mismatch in the resilient (diaphragm) 3', 4' flexures. Any remaining tilt can be corrected by an integrated tilt control system (not shown), as similarly described above in discussing the control of the tilt of beamsplitter 1', as shown in FIG. 1B.

Beneficially, the control system (not shown) that includes the velocity servo is similar to the systems for the embodiments of FIG. 2 and FIG. 3 so as easily incorporate such designs with that of FIG. 4 or even incorporate other conventional control systems if desired. However, with an all flexure system, such as that shown in FIG. 4, the travel of mirrors 3, 4 are nonetheless limited by the ratios of the spring retarding forces of resilient flexures 3', 4' and 1' that respectively support moving mirrors 3, 4 and moving beamsplitter 1. Despite such constraints, a beneficial desired spectral resolution of about 0.5 cm$^{-1}$ for the configuration of FIG. 4 results in an obtainable stroke length of up to about 7 millimeters.

As a beneficial embodiment, the total stroke length required can be split between moving mirrors 3, 4 and beamsplitter 1 in any ratio. As noted above, beamsplitter 1 travel can be of concern if the movement is greater than about +/−5 millimeter as it can collide with the compensator plate 2 and possibly cause damage to both elements. Accordingly, beamsplitter 1 can, as one arrangement, can be mounted on a predetermined stiff resilient flexure 1' to prohibit travel large enough to be of concern. Alternatively, and as discussed above with respect to the configuration of FIG. 3, a capacitor in series with the velocity control signal can limit beamsplitter 1 travel for the configuration of FIG. 4, as well as other embodiments disclosed herein as needed so as to eliminate the concerns for providing a resilient flexure 1' with the right amount of stiffness.

As even another example embodiment, the stroke limit of beamsplitter 1 can be constrained to travel at less than or equal to a millimeter in order to minimize beam lateral movement of illumination sources 7 and 19, as shown in FIG. 2 and FIG. 3. As a result, the coupled mirror 3, 4 assembly moves the remaining 6 millimeters via proper design. It is to be also noted that as a further example embodiment, mirrors 3, 4 can be configured with oversized dimensions with respect to received beam diameters so as avoid beam clipping as the received beams move laterally across their reflective and substantially flat surfaces. Thus, the beam lateral movement due to the movement of mirrors 3, 4 is not problematic.

Movement for the mirror 3, 4 assembly portion shown in FIG. 4 can be provided by motor means 52. In particular, the movement can be provided by any movement means known to those of ordinary skill in the art as long as such means meets the requirements of the present invention without departing from the specifications of the design. With respect to the example shown in FIG. 4, the means are provided by one or more drive magnets 26 coupled at about the center portion of a respective resilient flexure mount 3', 4', of which the coupling is in a manner similar to the coupling arrangement of beamsplitter 1' with its respective resilient flexure 1' of FIG. 1B.

The opposing side of the one or more magnets 26 can be designed to extend beyond a respective resilient flexure 3', 4' into a respective coil 25 to provide the driving force to move mirrors 3, 4 as directed by an integrated velocity servo (not shown). If incorporating two magnets 26 (one at each end of the moving mirror 3, 4 assembly shown in FIG. 4), sufficient linear motor force is provided to overcome the force of gravity on the overall moving mirror 3, 4 assembly allowing the system 400 to operate in any orientation (e.g., horizontal, vertical and angular orientations thereof), as discussed above. Specifically, by designing the ratio of beamsplitter 1 mass to its resilient flexure 1' stiffness to match the ratio of the moving mirror 3, 4 assembly mass to its respective collective resilient flexures 3', 4' stiffness, both the moving mirror 3, 4 and beamsplitter 1 assemblies can move by the same amount as the interferometer is tilted.

Accordingly, the design of the present invention shown in FIG. 4 can beneficially provide for a low cost high performance, fully portable interferometer (e.g., FTIR) system that is rugged enough to be carried around in various vehicles without the need for special care.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention.

The invention claimed is:

1. A dynamic velocity controlled interferometer, comprising:
 a first plane reflector configured to respectively receive and return a first portioned beam of a source along a first optical path length;
 a second plane reflector configured to respectively receive and return a second portioned beam of said source along a second optical path length;
 a moving beam splitter configured with a resilient member directly coupled about the periphery of said moving beam splitter, wherein said moving beam splitter is adapted for receiving a beam of radiation from said source so as to provide said first and said second portioned beams; and wherein said resilient member enables said moving beam splitter to move linearly in a direction toward and away but at a predetermined angle to said configured first and second plane reflectors;

a plurality of motors coupled to said moving beam splitter configured to independently drive linear movement and tilting movements about X and Y axes of said moving beamsplitter; and a control system configured to provide a feedback controlled velocity control signal and feedback controlled X and Y tilt control signals, said control system further configured to apply said velocity control signal to said plurality of motors to provide adjustment of the positions of said moving beamsplitter with a desired steady velocity, said control system further configured to apply said X and Y tilt control signals to one or more of said plurality of motors to provide said moving beamsplitter with a desired tilt about said X and Y axes, wherein said adjusted positions of said moving beamsplitter further enables optical path length differences between said first optical path length and said second optical path length that in combination provide an interrogating interferogram of the input source beam radiation at a configured exit of said interferometer.

2. The dynamic velocity controlled interferometer of claim 1, wherein said resilient member is designed to provide for about +/−5 millimeter of linear displacement and is further configured to provide a retarding force resultant from said about +/−5 millimeter of linear displacement.

3. A dynamic long-stroke velocity controlled interferometer, comprising:

a moving first plane reflector configured to respectively receive and return a first portioned beam of a source along a first optical path length, wherein said moving first plane reflector is coupled to a first motor configured to drive linear movement of said moving first plane reflector;

a second plane reflector configured to respectively receive and return a second portioned beam of said source along a second optical path length;

a moving beam splitter configured with a resilient member directly coupled about the periphery of said moving beam splitter, wherein said moving beam splitter is adapted for receiving a beam of radiation from said source so as to provide said first and said second portioned beams; and wherein said resilient member enables said moving beam splitter to move linearly in a direction toward and away but at a predetermined angle to said configured first and second plane reflectors;

a plurality of second motors coupled to said moving beam splitter configured to independently drive linear movement and tilting movements about X and Y axes of said moving beamsplitter; and a control system configured to provide a feedback controlled velocity control signal and feedback controlled X and Y tilt control signals, said control system further configured to apply said velocity control signal to both said first motor and to said plurality of second motors to provide adjustment of the positions of said moving beamsplitter and said moving first plane reflector with a desired steady velocity, said control system further configured to apply said X and Y tilt control signals to one or more of said plurality of second motors to provide said moving beamsplitter with a desired tilt about said X and Y axes, wherein said adjusted positions of said moving beamsplitter and said moving first plane reflector further enables optical path length differences between said first optical path length and said second optical path length that in combination provide an interrogating interferogram of the input source beam radiation at a configured exit of said interferometer.

4. The dynamic velocity controlled interferometer of claim 1, wherein said plurality of motors comprises a plurality of permanent magnets coupled to an input face of said moving beamsplitter, wherein applied feedback controlled magnetic fields selectively attract or repel said coupled permanent magnets simultaneously in order to direct said moving beamsplitter toward and away from said configured first and second plane reflectors.

5. The dynamic velocity controlled interferometer of claim 4, wherein said plurality of coupled permanent magnets are independently driven by applied feedback controlled magnetic forces to provide said tilting movements of said moving beamsplitter.

6. The dynamic velocity controlled interferometer of claim 1, wherein said moving beamsplitter is coupled with a compensator plate as part of an assembly, said compensator plate being configured with a resilient flexure arranged about the periphery of said compensator plate so as to protect said compensator plate from stress.

7. The dynamic velocity controlled interferometer of claim 6, wherein said compensator plate is mounted adjacent a coated side of said moving beamsplitter.

8. The dynamic velocity controlled interferometer of claim 1, wherein said predetermined angle of said moving beamsplitter is configured from about 15 degrees up to about 55 degrees.

9. The dynamic velocity controlled interferometer of claim 8, wherein said predetermined angle of said moving beamsplitter is configured at about 30 degrees as measured by the angle that the directed light to and from said first plane reflector and said second plane reflector makes with respect to the normal of said moving beamsplitter so as to result in the total travel needed for a configured spectral resolution of said interferometer to be reduced by a factor of about 1.7.

10. The dynamic velocity controlled interferometer of claim 1, wherein said moving beamsplitter provides for an optical multiplication that results in about a 1.7 reduction on the total travel and velocity and about 2 times less physical tilt needed of one or more arranged moving reflector components.

11. The dynamic velocity controlled interferometer of claim 1, wherein said control system is configured to provide said desired steady velocity to changes of less than about 0.2%.

12. The dynamic velocity controlled interferometer of claim 1, wherein a fixed aperture arranged at said exit of said interferometer is configured to eliminate sideways translational effects of a modulated source beam as a result of linear displacements of said moving beamsplitter.

13. The dynamic velocity controlled interferometer of claim 1, wherein said control system further comprises a detection system configured to monitor the relative longitudinal displacement of a surface of said moving beamsplitter, a surface of said first plane reflector, and a surface of said second plane reflector.

14. The dynamic velocity controlled interferometer of claim 13, wherein said detection system comprises a monitoring monochromatic electromagnetic source, said electromagnetic source being configured with a diameter of at least about 3 millimeters to minimize sideways translational effects of said electromagnetic source as a result of linear displacements of said moving beamsplitter.

15. The dynamic velocity controlled interferometer of claim 13, wherein said detection system further comprises at least one detector positioned at the entrance of said interferometer so as to monitor tilt, velocity, and position of said moving beamsplitter, wherein said at least one detector positioned about the entrance has the same optical velocity and position information as an exiting beam and wherein a monitored beam does not translate sideways even as said moving beamsplitter translates.

16. The dynamic velocity controlled interferometer of claim 1, wherein said interferometer is configured to provide a resolution of about 0.05 cm$^{-1}$ to about 64 cm$^{-1}$.

17. The dynamic velocity controlled interferometer of claim 1, wherein said first plane reflector and said second plane reflector is configured to operate as a moveable dual reflector assembly.

18. The dynamic velocity controlled interferometer of claim 17, wherein said moveable dual reflector is resiliently mounted via one or more resilient flexures and said moving beamsplitter and said resiliently mounted, moveable dual reflector assembly are characterized by substantially matched resilient flexure stiffness to mass ratios so that said resiliently mounted, moveable dual reflector assembly can operate in any orientation.

19. The dynamic velocity controlled interferometer of claim 17, wherein said interferometer provides for a total stroke length of up to about 7 millimeters to enable a resolution of about 0.5 cm$^{-1}$.

20. The dynamic velocity controlled interferometer of claim 17, wherein said moving beamsplitter provides for a movement of about 1 millimeter and said dual moveable reflector assembly provides for about 6 millimeters of stroke length.

21. The dynamic velocity controlled interferometer of claim 17, wherein said moveable dual reflector assembly reduces pick-up of external vibrations having frequencies of greater than about 10 Hz.

22. The dynamic velocity controlled interferometer of claim 17, wherein the reflectors of said dual assembly are coupled in a U-shaped mount and configured with a pair of respective resilient flexures at the outer ends of said mount to provide support for said assembly, and wherein movement of said assembly is provided by coupled one or more magnetic motors.

23. The dynamic velocity controlled interferometer of claim 22, wherein the spacing of said pair of respective resilient flexures is between about 50 millimeters and about 200 millimeters.

24. The dynamic velocity controlled interferometer of claim 3, wherein a capacitor configured in series with said velocity control signal operates like a stiffer flexure so as to cooperate with said resilient member in order to limit said moving beamsplitter travel within to about +/−1 millimeter of linear displacement.

25. The dynamic long-stroke velocity controlled interferometer of claim 3, wherein said control system is configured to provide said desired steady velocity to changes of less than about 0.2%.

26. The dynamic long-stroke velocity controlled interferometer of claim 3, wherein said moving first plane reflector is coupled to a moving bearing assembly configured to position the front surface of said moving first plane reflector substantially perpendicular along a longitudinal axis of said moving bearing assembly.

27. The dynamic long-stroke velocity controlled interferometer of claim 26, wherein a bearing noise of said moving bearing assembly can be removed by arranging said moving first plane reflector to be held in a fixed position using at least one of: a mechanical, a magnetic, and an electrical braking means.

28. The dynamic long-stroke velocity controlled interferometer of claim 3, wherein said control system further comprises a detector system configured to monitoring the front surface of said moving first plane reflector, said second plane reflector and said moving beamsplitter and to monitor the relative velocity the front face of said moving beamsplitter and/or said moving first plane reflector with respect to a respective predetermined longitudinal axis.

29. The dynamic long-stroke velocity controlled interferometer of claim 2, wherein said velocity control signal is sent through a high pass filter prior to being applied to said plurality of second motors while said velocity control signal is applied to said first motor without high pass filtering.

30. The dynamic long-stroke velocity controlled interferometer of claim 3, wherein said resilient member is designed to provide for less than +/−5 millimeter of linear displacement and is further configured to provide a retarding force resultant from said less than +/−5 millimeter of linear displacement.

31. The dynamic long-stroke velocity controlled interferometer of claim 3, wherein said plurality of second motors comprises a plurality of permanent magnets coupled to said moving beamsplitter, wherein applied feedback controlled magnetic fields selectively attract or repel said coupled permanent magnets simultaneously in order to direct said moving beamsplitter toward and away from said configured first and second plane reflectors.

32. The dynamic long-stroke velocity controlled interferometer of claim 31, wherein said plurality of coupled permanent magnets are independently driven by applied feedback controlled magnetic forces to provide said tilting movements of said moving beamsplitter.

33. The dynamic long-stroke velocity controlled interferometer of claim 24, wherein said predetermined angle of said moving beamsplitter is configured at about 30 degrees.

34. The dynamic long-stroke velocity controlled interferometer of claim 3, wherein said interferometer is configured to provide a resolution of about 0.05 cm$^{-1}$ to about 64 cm$^{-1}$.

* * * * *

UNITED STATES PATENT AND TRADEMARK OFFICE
CERTIFICATE OF CORRECTION

PATENT NO. : 9,001,334 B2
APPLICATION NO. : 12/944512
DATED : April 7, 2015
INVENTOR(S) : John Magie Coffin It is certified that error appears in the above-identified patent and that said Letters Patent is hereby corrected as shown below:

In the Claims:

In Column 19, Claim 24, Line 48, after "dynamic" insert -- long-stroke --.

In Column 20, Claim 28, Line 18, delete "monitoring" and insert -- monitor --, therefor.

In Column 20, Claim 29, Line 25, delete "2," and insert -- 3, --, therefor.

In Column 20, Claim 33, Line 47, delete "24," and insert -- 3, --, therefor.

Signed and Sealed this
Thirty-first Day of May, 2016

Michelle K. Lee
*Director of the United States Patent and Trademark Office*